(12) United States Patent
Hara et al.

(10) Patent No.: US 8,091,910 B2
(45) Date of Patent: Jan. 10, 2012

(54) APPARATUS FOR CONTROLLING A BICYCLE SUSPENSION ELEMENT

(75) Inventors: Nobukatsu Hara, Izumisano (JP); Toshikuni Suzuki, Sakai (JP)

(73) Assignee: Shimano, Inc., Sakai-ku, Sakai (JP)

( * ) Notice: Subject to any disclaimer, the term of this patent is extended or adjusted under 35 U.S.C. 154(b) by 218 days.

(21) Appl. No.: 12/493,619

(22) Filed: Jun. 29, 2009

(65) Prior Publication Data

US 2010/0327542 A1 Dec. 30, 2010

(51) Int. Cl.
*B62K 25/04* (2006.01)
*B60G 17/016* (2006.01)

(52) U.S. Cl. .................. 280/283; 280/284; 280/5.504; 280/5.519

(58) Field of Classification Search .............. 280/283, 280/284, 5.504, 5.519
See application file for complete search history.

(56) References Cited

U.S. PATENT DOCUMENTS

| 482,696 A | 9/1892 | Rockwell |
| 3,861,740 A | 1/1975 | Tajima et al. |
| 6,050,583 A | 4/2000 | Bohn |
| 6,131,709 A | 10/2000 | Jolly et al. |
| 6,149,174 A | 11/2000 | Bohn |
| 6,336,648 B1 | 1/2002 | Bohn |
| 6,619,684 B2 | 9/2003 | Miyoshi |

FOREIGN PATENT DOCUMENTS
WO 03-022671 A2 3/2003

*Primary Examiner* — Tony H. Winner
*Assistant Examiner* — Wesley Potter
(74) *Attorney, Agent, or Firm* — James A. Deland

(57) ABSTRACT

An apparatus for controlling a bicycle suspension element includes a suspension parameter controller that provides a suspension parameter controlling signal to control an operating parameter of the bicycle suspension element in response to a bicycle seat position.

26 Claims, 5 Drawing Sheets

APPARATUS FOR CONTROLLING A BICYCLE SUSPENSION ELEMENT

BACKGROUND OF THE INVENTION

The present invention is directed to bicycles and, more particularly, to various features of an apparatus for controlling a bicycle suspension element.

Bicycle suspensions often comprise front and rear suspension elements. The front suspension element typically comprises a pair of shock absorbers that form portions of the legs of the front wheel fork, and the rear suspension element typically comprises a shock absorber with one end mounted to the front portion of the frame and another end mounted to a pivoting rear swing arm that supports the rear wheel. In any case, the shock absorber usually comprises an outer tubular suspension member and an axially movable telescoping inner tubular suspension member. A piston is coupled to the inner tubular suspension member, wherein the piston has an outer peripheral surface that sealingly and slidably engages the inner peripheral surface of the outer tubular suspension member to form a compression chamber in which a compressible fluid such as air is disposed. Some shock absorbers form separate chambers on opposite sides of the piston so that further operating parameters, such as ride height or stroke, may be controlled.

Some shock absorbers are constructed to allow the rider to vary several operating parameters to accommodate varying riding conditions. Such parameters include spring preload (for shock absorbers that use a coil spring), compression damping (to control the rate of shock absorber retraction), rebound damping (to control the rate of shock absorber extension), pedaling damping (to damp oscillation of the shock absorber caused by pedaling forces), cylinder pressure, cylinder volume, and lockout (the ability to turn the shock absorbing function off). However, such adjustments are made manually and usually require the rider to dismount the bicycle and set each parameter adjustment control device separately.

SUMMARY OF THE INVENTION

The present invention is directed to various features of an apparatus for controlling a bicycle suspension element. In one embodiment, an apparatus for controlling a bicycle suspension element includes a suspension parameter controller that provides a suspension parameter controlling signal to control an operating parameter of the bicycle suspension element in response to a bicycle seat position. Additional inventive features will become apparent from the description below, and such features may be combined with the above features to provide additional benefits.

DETAILED DESCRIPTION OF THE EMBODIMENTS

Figure 1:
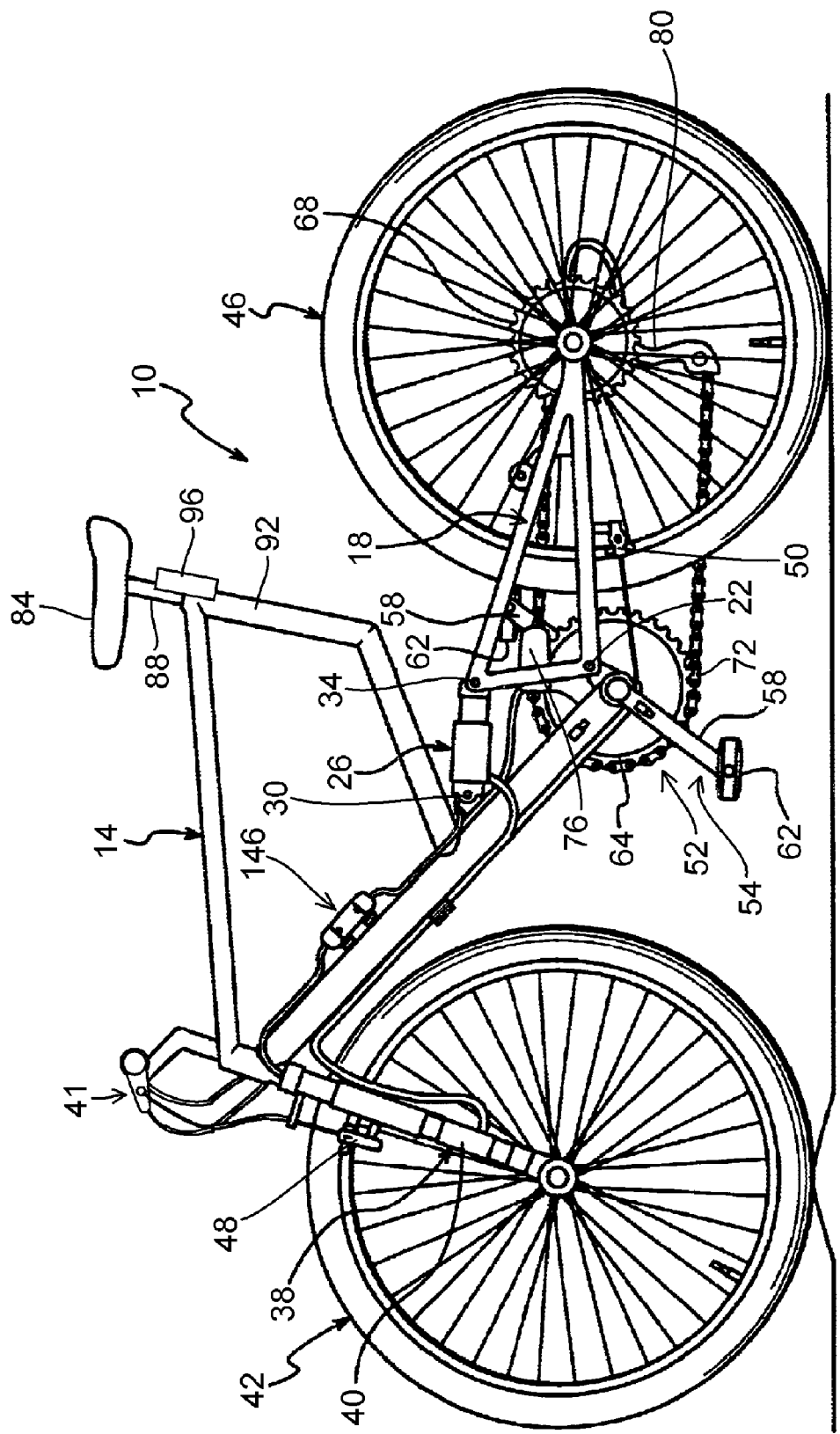
FIG. 1 is a side view of a bicycle that includes particular embodiments of bicycle suspension elements.

FIG. 1 is a side view of a bicycle 10 that includes particular embodiments of bicycle suspension elements. Bicycle 10 is a sport bicycle in the form of a mountain bicycle, and it comprises a front frame portion 14, a rear frame portion 18 pivotably coupled to front frame portion 14 through a pivot shaft 22, a rear suspension element 26 with a front end pivotably coupled to front frame portion 14 through a pivot shaft 30 and a rear end pivotably coupled to rear frame portion 18 through a pivot shaft 34, a front fork 38 rotatably mounted to front frame portion 14 and including a pair of front suspension elements 40, a handlebar assembly 41 mounted to the upper part of fork 38, a front wheel 42 rotatably attached to the lower part of fork 38, a rear wheel 46 rotatably attached to the rear of rear frame portion 18, a front brake 48 for braking front wheel 42, a rear brake 50 for braking rear wheel 46, and a drive mechanism 52.

Drive mechanism 52 comprises a pedal crank 54 that includes a pair of crank arms 58 with attached pedals 62, a plurality of front sprockets 64 attached to pedal crank 54, a plurality of rear sprockets 68 attached to rear wheel 46, a chain 72, an electrically-controlled front derailleur transmission 76 for engaging chain 72 with selective ones of the plurality of front sprockets 64, and an electrically-controlled rear derailleur transmission 80 for engaging chain 72 with selective ones of the plurality of rear sprockets 68. Front derailleur transmission 76 includes a front derailleur position sensor ((82), FIG. 3) to detect the position of front derailleur transmission 76 and hence the current speed step of front derailleur transmission 76. Similarly, rear derailleur transmission 80 includes a rear derailleur position sensor ((83), FIG. 3) to detect the position of rear derailleur transmission 80 and hence the current speed step of rear derailleur transmission 80.

A bicycle seat in the form of a saddle 84 is mounted to front frame portion 14 through a seat post 88 that telescopically fits within a seat tube 92 of front frame portion 14. A seat position sensor 96 is mounted to seat tube 92 and cooperates with seat post 88 to sense the position of saddle 84 relative to seat tube 92. A seat position driver ((98), FIG. 3) is mounted within seat tube 92 and is connected to seat post 88 to adjust the height of saddle 84. Seat position driver 98 may be an electric motor such as a screw-drive motor, or it may be an air-operated motor, a hydraulic fluid motor, and so on. Seat position sensor 96 may comprise a variable electrical resistance such as a contact strip mounted to seat tube 92 and an electrical brush mounted to seat post 88, a potentiometer with a gear shaft mounted to seat tube 92 and a toothed rack formed in or mounted to seat post 88, an optical sensor comprising a phototransistor mounted to seat tube and a shutter strip mounted to seat post 88, an internally mounted pressure sensor (in the case of an air or hydraulic drive motor), or some other suitable sensor.

Figure 2:
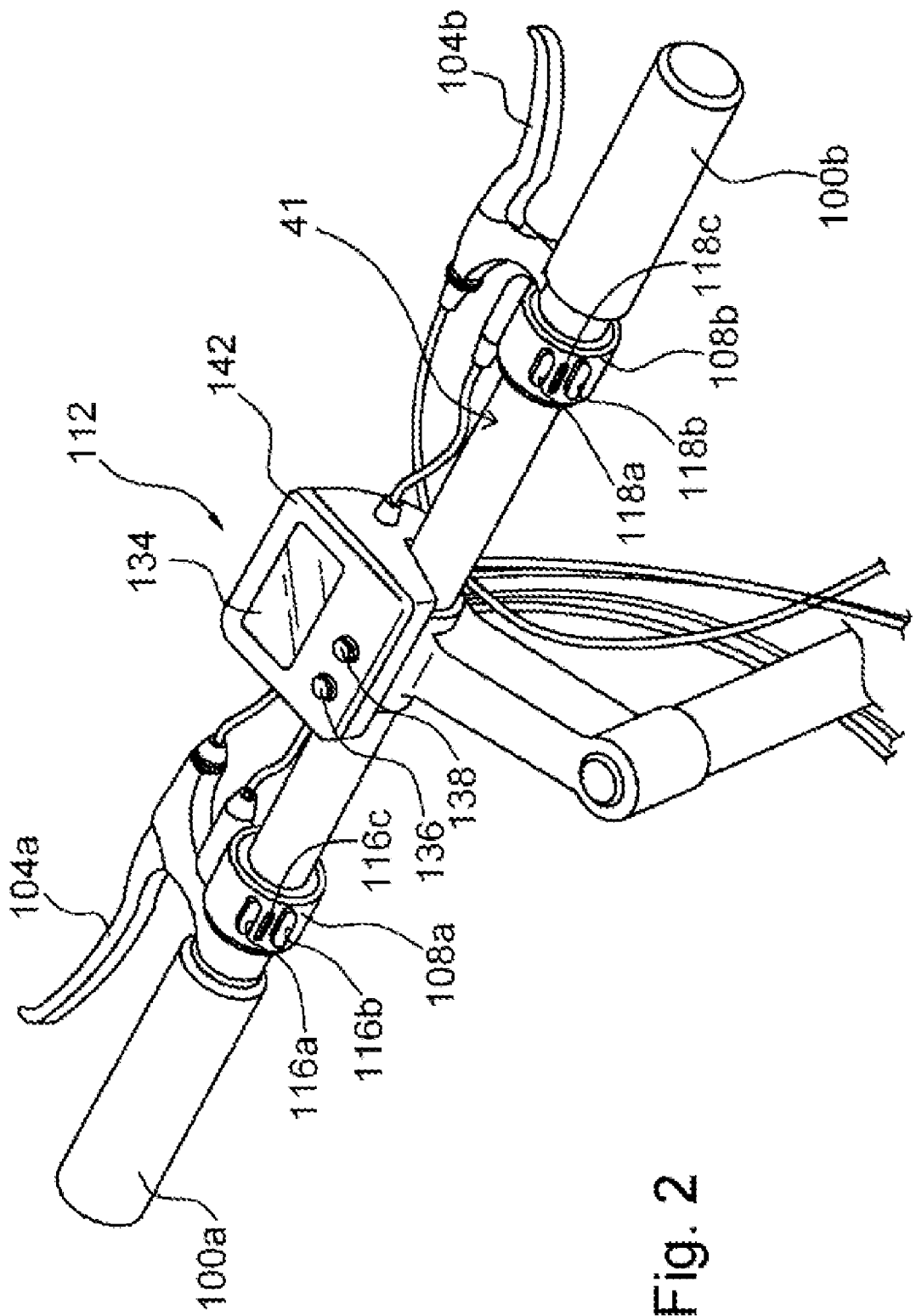
FIG. 2 is a detailed view of particular embodiments of handlebar mounted components of the bicycle shown in FIG. 1.

As shown in FIG. 2, respective grips 100a, 100b and brake levers 104a, 104b are provided on both ends of handlebar assembly 41. Brake lever 104a is connected to front wheel brake 48 for braking front wheel 42, and brake lever 104b is connected to rear wheel brake 50 for braking rear wheel 46. Shift command units 108a, 108b are provided inwardly of grips 100a, 100b and brake levers 104a, 104b, respectively, and a transmission/suspension control unit 112 is attached to the central portion of handlebar assembly 41. Transmission/suspension control unit 112 is connected to shift command units 108a, 108b, to front derailleur transmission 76, to rear derailleur transmission 80, to bicycle seat position sensor 96 and to seat position driver 98 through appropriate wiring. Of course, transmission/suspension control unit 112 may be operatively coupled to any one of those components by appropriate wireless communication devices as well.

Shift command units 108a, 108b are used for shifting front derailleur transmission 76 and rear derailleur transmission 80 and for controlling the height of saddle 84. More specifically, a front upshift button 116a, a front downshift button 116b and a seat up button 116c are provided in shift command unit 108a, and a rear upshift button 118a, a rear downshift button 118b and a seat down button 118c are provided in shift command unit 108b. In this embodiment, upshift buttons 116a and 118a provide signals for upshifting front and rear derailleur transmissions 76 and 80 by one speed step, and downshift buttons 116b and 118b provide signals for downshifting front and rear transmissions 76 and 80 by one speed step. Seat up button 116c provides signals to raise saddle 84, and seat down button 118c provides signals to lower saddle 84.

Transmission/suspension control unit 112 controls the operation of front derailleur transmission 76 and rear derailleur transmission 80 according to the signals provided by shift command units 108a and 108b. Transmission/suspension control unit 112 also controls the operation of seat position driver 98 according to the signals provided by seat up button 116c and seat down button 118c, and transmission/suspension control unit 112 controls user-controllable operating parameters of front suspension elements 40 and rear suspension element 26 using signals received from seat position sensor 96 and/or front derailleur position sensor 82 and rear derailleur position sensor 83.

Figure 3:
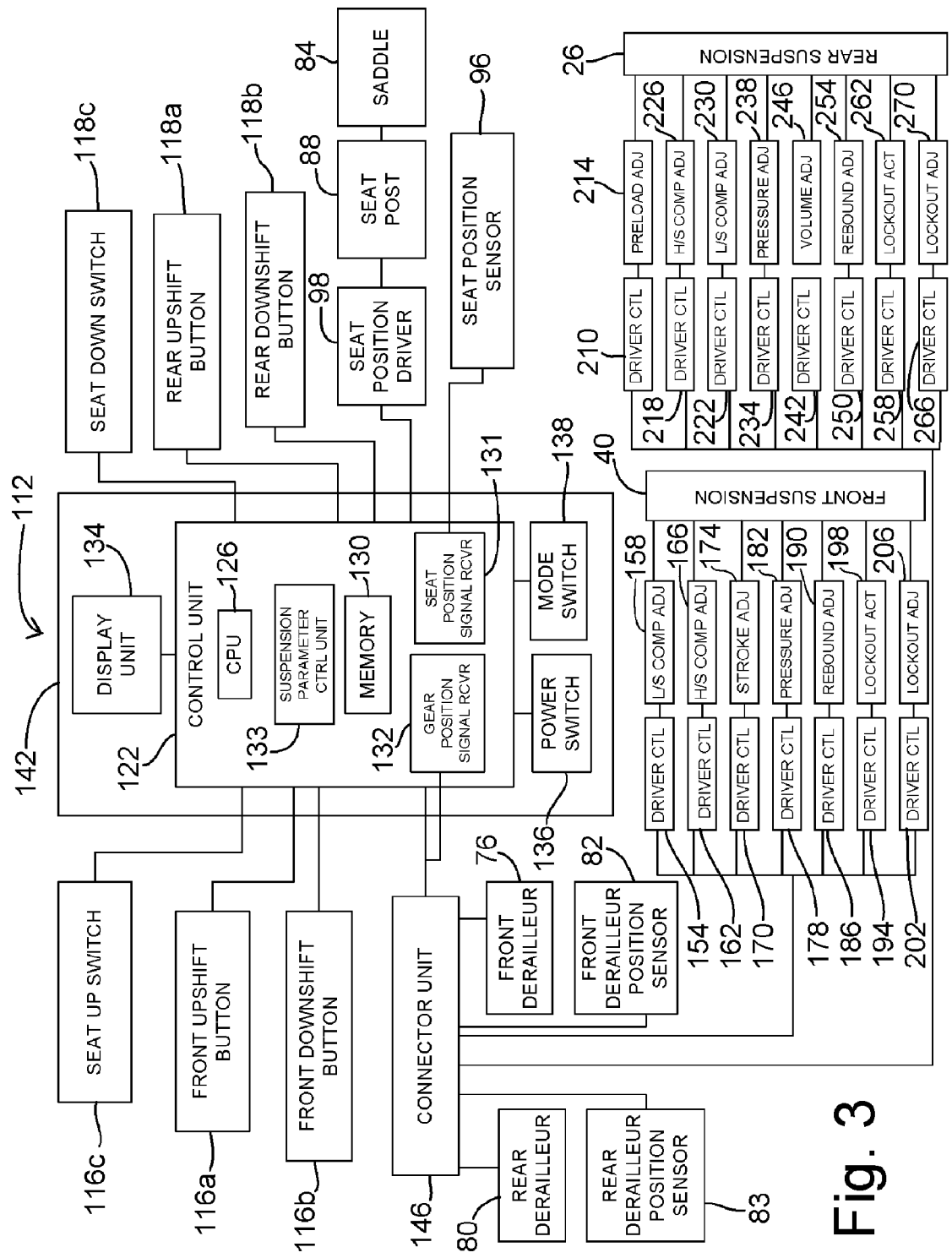
FIG. 3 is a block diagram of a particular embodiment of a control mechanism.

As shown in FIG. 3, transmission/suspension control unit 112 comprises a control unit 122 having a CPU 126, a memory 130, a seat position signal receiver 131 for receiving the seat position signals from seat position sensor 96, a gear position signal receiver 132 for receiving gear position signals from front derailleur position sensor 82 and rear derailleur position sensor 83, a suspension parameter control unit 133 that provides suspension parameter controlling signals to control the operating parameters of front suspension elements 40 and/or rear suspension element 26 in response to the bicycle seat position signals and/or the gear position signals, a display unit 134 for displaying the current speed step and other information, a power switch 136, and a mode switch 138. Power switch 136 turns transmission/suspension control unit 112 on and off, and mode switch 138 changes an operating mode of transmission/suspension control unit 112. CPU 126 is a programmed processor that operates according to the information stored in memory 130. Seat position signal receiver 131 and gear position signal receiver 132 may comprise appropriate input terminals and buffers to convert the input signals into proper signals for use by the control programs, they may comprise wireless receivers, optical receivers, and so on.

As shown in FIG. 2, transmission/suspension control unit 112 includes a box-like housing 142. Display unit 134, power switch 136, and mode switch 138 are arranged on the upper surface of housing 142. As shown in FIGS. 1 and 3, transmission/suspension control unit 112 is connected to front derailleur transmission 76, to rear derailleur transmission 80, to front derailleur position sensor 82, to rear derailleur position sensor 83, and to front and rear suspension control elements (described below) by a connector unit 146.

In this embodiment, front suspension elements 40 comprise a pair of air-operated shock absorbers with external adjustment elements for low speed and high speed compression damping (e.g., driver control units 154, 162 and a separate lever-operated adjustment knob 158, 166 for each setting), for stroke (piston travel or compression chamber volume) (e.g., a driver control unit 170 and a lever-operated adjustment knob 174), for air chamber pressure (e.g., a driver control unit 178 and an air valve 182), for rebound damping (e.g., a driver control unit 186 and a lever-operated adjustment knob 190), for lockout actuation (e.g., a driver control unit 194 and a lever-operated actuation knob 198), and for lockout force adjustment (e.g., a driver control unit 202 and a lever-operated adjustment knob 206). In this embodiment, rear suspension element 26 comprises a combination air- and oil-operated shock absorber with a typical external spring (not shown in the drawings). Rear suspension element 26 includes external adjustment elements for spring preload (e.g., a driver control unit 210 and a lever-operated adjustment nut 214), for low speed and high speed compression damping (e.g., driver control units 218, 222 and a separate lever-operated knob 226, 230 for each setting), for air chamber pressure adjustment (e.g., a driver control unit 234 and an air pressure adjusting valve 238), for air chamber volume adjustment (e.g., a driver control unit 242 and a lever-operated adjustment screw 246), for rebound damping (e.g., a driver control unit 250 and a lever-operated adjustment knob 254), for lockout actuation (e.g., a driver control unit 258 and a lever-operated actuating knob 262), and for lockout force adjustment (e.g., a driver control unit 266 and a lever-operated adjustment knob 270). Air chamber pressure and volume adjustments may be used to adjust the pressure and volume of the main air chamber or for pedaling damping. Examples of such parameter adjustments may be found in current shock absorbers sold by Fox and Manitou, for example.

Driver control units for adjustment elements that make adjustments in a continuous manner (e.g., compression damping) may comprise continuous-movement motors or some other suitable motor together with position sensors (potentiometers, resistive position sensors, optical position sensors, contact switches, etc.) that indicate the operating position of the associated knob, lever or other adjusting element. If desired, each driver control unit may include its own microprocessor to control the operation of its associated motor in response to signals provided by suspension parameter control unit 133 and to provide status signals to control unit 122. Similarly, driver control units for adjustment elements that make adjustments in discrete increments (e.g., three-step stroke adjustment) may comprise stepper motors or some other suitable motor together with position sensors that indicate the operating position of the associated knob, lever or other adjusting element and with any desired additional microprocessors. Driver control units for adjustment elements that operate in an on/off manner (e.g., lockout actuation) may comprise a solenoid or some other suitable driver together with position sensors that indicate the operating position of the associated knob, lever or other adjusting element and with any desired additional microprocessors.

Figure 4:
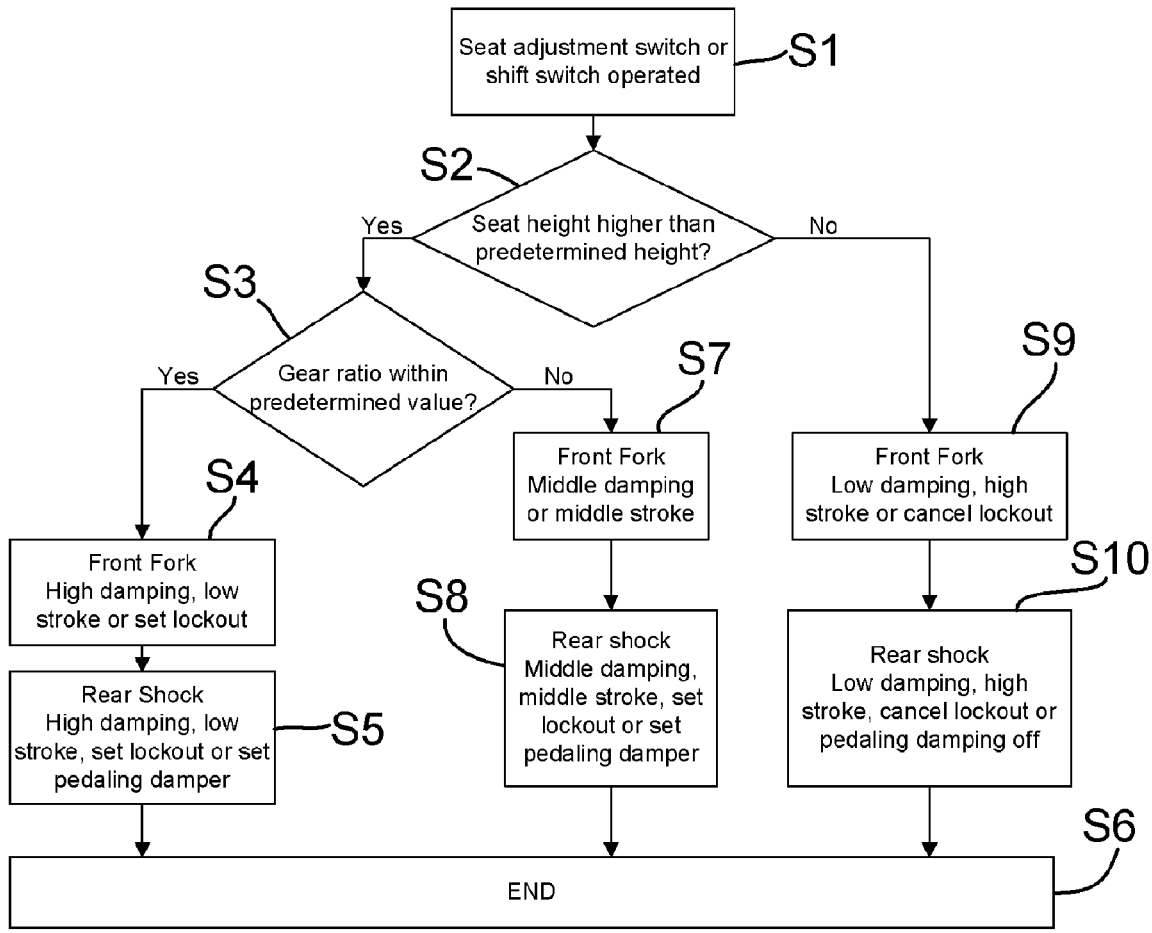
FIG. 4 is a flow chart of a particular embodiment of an algorithm used to control the suspension elements.

FIG. 4 is a flow chart of a particular embodiment of an algorithm used to control front suspension elements 40 and rear suspension element 26. Processing begins in step S1 when one of the shift switches 116a, 116b, 118a, 118b or one of the seat adjustment switches 116c, 118c is operated. It is then determined in a step S2 from the signal received from seat position sensor 96 whether or not the seat height is higher than a predetermined value. The rider may set the seat height to a high value when riding uphill or on a level surface. If the seat height is higher than a predetermined value, it is then determined in step S3 whether or not front derailleur transmission 76 and rear derailleur transmission 80 are set to a predetermined gear ratio or within a predetermined gear ratio range (e.g., 1.0-0.65, or below 1.0). If so, then suspension parameter control unit 133 provides a suspension parameter controlling signal in a step S4 for controlling front suspension elements 40 to perform at least one of increasing a damping value of front suspension elements 40 (e.g., setting front suspension elements 40 to a high damping setting), decreasing a stroke value of front suspension elements 40 (e.g., setting front suspension elements 40 to a low stroke setting), or setting a lockout value of front suspension elements 40 so that front suspension elements 40 are in a lockout state. Then, in a step S5, suspension parameter control unit 133 provides a suspension parameter controlling signal for controlling rear suspension element 26 to perform at least one of increasing a damping value of rear suspension element 26 (e.g., setting rear suspension element 26 to a high damping setting), decreasing a stroke value of rear suspension element 26 (e.g., setting rear suspension element 26 to a low stroke setting), setting a lockout value of rear suspension element 26 so that rear suspension element 26 is in a lockout state, or turning on pedaling damping (and setting the amount of pedaling damping accordingly). Specific examples of possible combinations include (a) increasing the damping of front suspension elements 40 and decreasing the stroke of rear suspension element 26, (b) increasing the damping of front bicycle suspension elements 40 and setting rear bicycle suspension element 26 into a lockout state, (c) decreasing the stroke of front bicycle suspension elements (40) and increasing the damping of rear suspension element 26, (d) decreasing the stroke of front suspension elements 40 and setting rear suspension element 26 into a lockout state, (e) decreasing the stroke of rear suspension element 26 and setting front suspension elements 40 into a lockout state, (f) increasing the damping of rear suspension element 26 and setting front suspension elements into a lockout state, (g) increasing the damping of front and rear suspension elements 40, 26, (h) decreasing the stroke of front and rear bicycle suspension elements 40, 26, (i) setting front and rear suspension elements 40, 26 into a lockout state or (j) decreasing the stroke of front bicycle suspension elements 40 and increasing the stroke of rear suspension element 26 (e.g., to maintain a horizontal orientation of the bicycle). After front suspension elements 40 and rear suspension element 26 are set to the desired operating parameters, the procedure ends in step S6 until the next operation of one of the shift switches 116a, 116b, 118a, 118b or one of the seat adjustment switches 116c, 118c.

If it is determined in step S3 that front derailleur transmission 76 and rear derailleur transmission 80 are not set to the predetermined gear ratio or within the predetermined gear ratio range (e.g., the gear ratio is 4.0-1.0, or above 1.0), then suspension parameter control unit 133 provides a suspension parameter controlling signal in a step S7 for controlling front suspension elements 40 to perform at least one of setting a damping value of front suspension elements 40 to a middle damping setting or setting a stroke value of front suspension elements 40 a middle stroke setting. Then, in a step S8, suspension parameter control unit 133 provides a suspension parameter controlling signal for controlling rear suspension element 26 to perform at least one of setting a damping value of rear suspension element 26 to a middle damping setting, setting a stroke value of rear suspension element 26 to a middle stroke setting, setting a lockout value of rear suspension element 26 so that rear suspension element 26 is in a lockout state, or turning on pedaling damping (and setting the amount of pedaling damping accordingly). After front suspension elements 40 and rear suspension element 26 are set to the desired operating parameters, the procedure ends in step S6 until the next operation of one of the shift switches 116a, 116b, 118a, 118b or one of the seat adjustment switches 116c, 118c.

If it is determined in step S2 that the seat height is not higher than the predetermined value (the rider may set the seat height to a low value when riding downhill), then suspension parameter control unit 133 provides a suspension parameter controlling signal in a step S9 for controlling front suspension elements 40 to perform at least one of decreasing a damping value of front suspension elements 40 (e.g., setting front suspension elements 40 to a low damping setting), increasing a stroke value of front suspension elements 40 (e.g., setting front suspension elements 40 to a high stroke setting), or setting a lockout value of the front suspension elements 40 so that front suspension elements 40 are not in a lockout state (and the lockout force may be adjusted as desired). Then, in a step S10, suspension parameter control unit provides a suspension parameter controlling signal for controlling rear suspension element 26 to perform at least one of decreasing a damping value of rear suspension element 26 (e.g., setting rear suspension element 26 to a low damping setting), increasing a stroke value of rear suspension element 26 (e.g., setting rear suspension element 26 to a high stroke setting), setting a lockout value of rear suspension element 26 so that rear suspension element 26 is not in a lockout state (and the lockout force may be adjusted accordingly), or turning off pedaling damping. Specific examples of possible combinations include (a) decreasing the damping of front suspension elements 40 and increasing the stroke of rear suspension element 26, (b) decreasing the damping of front suspension elements 40 and canceling any lockout of rear suspension element 26, (c) increasing the stroke of front suspension elements 40 and decreasing the damping of rear suspension element 26, (d) increasing the stroke of front bicycle suspension elements 40 and canceling any lockout of rear bicycle suspension element 26, (e) increasing the stroke of rear bicycle suspension element 26 and canceling any lockout of front suspension elements 40, (f) decreasing the damping of rear suspension element 26 and canceling any lockout of front suspension elements 40, (g) increasing the damping of front and rear suspension elements 40, 26, (h) decreasing the stroke of front and rear bicycle suspension elements 40, 26, (i) setting front and rear suspension elements 40, 26 into a lockout state or (j) decreasing the stroke of front bicycle suspension elements 40 and increasing the stroke of rear suspension element 26 (e.g., to maintain a horizontal orientation of the bicycle). After front suspension elements 40 and rear suspension element 26 are set to the desired operating parameters, the procedure ends in a step S6 until the next operation of one of the shift switches 116a, 116b, 118a, 118b or one of the seat adjustment switches 116c, 118c.

Figure 5:
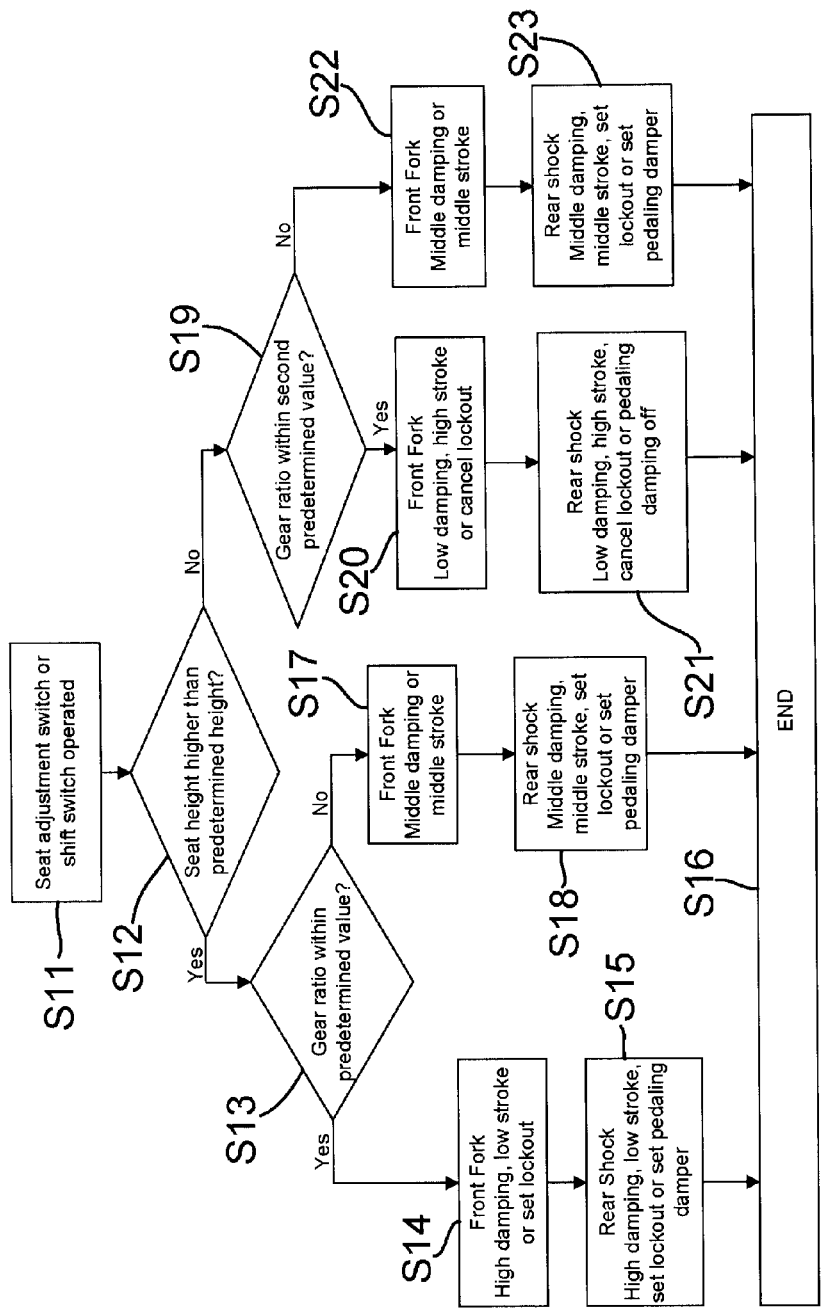
FIG. 5 is a flow chart of another embodiment of an algorithm used to control the suspension elements.

FIG. 5 is a flow chart of another embodiment of an algorithm used to control front suspension elements 40 and rear suspension element 26. Processing begins in step S11 when one of the shift switches 116a, 116b, 118a, 118b or one of the seat adjustment switches 116c, 118c has been operated. It is then determined in a step S12 from the signal received from seat position sensor 96 whether or not the seat height is higher than a predetermined value. If so, it is then determined in step S13 whether or not front derailleur transmission 76 and rear derailleur transmission 80 are set to a predetermined gear ratio or within a predetermined gear ratio range (e.g., 1.0-0.65, or below 1.0). If so, then suspension parameter control unit 133 provides a suspension parameter controlling signal in a step S14 for controlling front suspension elements 40 to perform at least one of increasing a damping value of front suspension elements 40 (e.g., setting front suspension elements 40 to a high damping setting), decreasing a stroke value of front suspension elements 40 (e.g., setting front suspension elements 40 to a low stroke setting), or setting a lockout value of front suspension elements 40 so that front suspension elements 40 are in a lockout state. Then, in a step S15, suspension parameter control unit 133 provides a suspension parameter controlling signal for controlling rear suspension element 26 to perform at least one of increasing a damping value of rear suspension element 26 (e.g., setting rear suspension element 26 to a high damping setting), decreasing a stroke value of rear suspension element 26 (e.g., setting rear suspension element 26 to a low stroke setting), setting a lockout value of rear suspension element 26 so that rear suspension element 26 is in a lockout state, or turning on pedaling damping (and setting the amount of pedaling damping accordingly). Specific examples of possible combinations include the same combinations noted for steps S4 and S5 in the first embodiment. After front suspension elements 40 and rear suspension element 26 are set to the desired operating parameters, the procedure ends in step S16 until the next operation of one of the shift switches 116a, 116b, 118a, 118b or one of the seat adjustment switches 116c, 118c.

If it is determined in step S13 that front derailleur transmission 76 and rear derailleur transmission 80 are not set to the predetermined gear ratio or within the predetermined gear ratio range (e.g., the gear ratio is 4.0-1.0, or above 1.0), then suspension parameter control unit 133 provides a suspension parameter controlling signal in a step S17 for controlling front suspension elements 40 to perform at least one of setting a damping value of front suspension elements 40 to a middle damping setting or setting a stroke value of front suspension elements 40 a middle stroke setting. Then, in a step S18, suspension parameter control unit 133 provides a suspension parameter controlling signal for controlling rear suspension element 26 to perform at least one of setting a damping value of rear suspension element 26 to a middle damping setting, setting a stroke value of rear suspension element 26 to a middle stroke setting, setting a lockout value of rear suspension element 26 so that rear suspension element 26 is in a lockout state, or turning on pedaling damping (and setting the amount of pedaling damping accordingly). After front suspension elements 40 and rear suspension element 26 are set to the desired operating parameters, the procedure ends in step S16 until the next operation of one of the shift switches 116a, 116b, 118a, 118b or one of the seat adjustment switches 116c, 118c.

If it is determined in step S12 that the seat height is not higher than the predetermined height, it is then determined in step S19 whether or not front derailleur transmission 76 and rear derailleur transmission 80 are set to another predetermined gear ratio or within a predetermined gear ratio range (e.g., 4.0-1.25, or over 1.25). If so, then suspension parameter control unit 133 provides a suspension parameter controlling signal in a step S20 for controlling front suspension elements 40 to perform at least one of decreasing a damping value of front suspension elements 40 (e.g., setting front suspension elements 40 to a low damping setting), increasing a stroke value of front suspension elements 40 (e.g., setting front suspension elements 40 to a high stroke setting), or setting a lockout value of the front suspension elements 40 so that front suspension elements 40 are not in a lockout state (and the lockout force may be adjusted as desired). Then, in a step S21, suspension parameter control unit provides a suspension parameter controlling signal for controlling rear suspension element 26 to perform at least one of decreasing a damping value of rear suspension element 26 (e.g., setting rear suspension element 26 to a low damping setting), increasing a stroke value of rear suspension element 26 (e.g., setting rear suspension element 26 to a high stroke setting), setting a lockout value of rear suspension element 26 so that rear suspension element 26 is not in a lockout state (and the lockout force may be adjusted accordingly), or turning off pedaling damping.

If it is determined in step S19 that front derailleur transmission 76 and rear derailleur transmission 80 are not set to the predetermined gear ratio or within the predetermined gear ratio range (e.g., the gear ratio is 1.25-0.65, or below 1.25), then suspension parameter control unit 133 provides a suspension parameter controlling signal in a step S22 for controlling front suspension elements 40 to perform at least one of setting a damping value of front suspension elements 40 to a middle damping setting or setting a stroke value of front suspension elements 40 a middle stroke setting. Then, in a step S23, suspension parameter control unit 133 provides a suspension parameter controlling signal for controlling rear suspension element 26 to perform at least one of setting a damping value of rear suspension element 26 to a middle damping setting, setting a stroke value of rear suspension element 26 to a middle stroke setting, setting a lockout value of rear suspension element 26 so that rear suspension element 26 is in a lockout state, or turning on pedaling damping (and setting the amount of pedaling damping accordingly). After front suspension elements 40 and rear suspension element 26 are set to the desired operating parameters, the procedure ends in step S16 until the next operation of one of the shift switches 116a, 116b, 118a, 118b or one of the seat adjustment switches 116c, 118c.

While the above is a description of various embodiments of inventive features, further modifications may be employed without departing from the spirit and scope of the present invention. For example, in the described embodiment bicycle 10 had electrically operated front and rear derailleur transmissions 76 and 60, but the teaching herein could be applied to mechanically-controlled front and rear transmissions. In that case, the positions of the front and rear derailleurs could be determined by position sensors mounted to the front and rear derailleurs as in the described embodiments or by position sensors mounted to the front and rear shift control devices (e.g., levers or twist-grip shift control devices). While air- and oil-operated shock absorbers were disclosed, any pressure-operated or spring-operated shock absorber could be used, such as a hydraulically-operated shock absorber.

While the height of saddle 84 in the disclosed embodiment was electrically-controlled, the teachings herein could be applied to a manually-adjusted saddle wherein the height of saddle 84 is adjusted by a cable-operated lever. In that case, the algorithms shown in FIGS. 4 and 5 may be executed upon operation of the adjustment lever upon operation of one of shift switches 116a, 116b, 118a or 118b, or upon the occurrence of some other event.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An apparatus for controlling a bicycle suspension element comprising a suspension parameter controller that provides a suspension parameter controlling signal to control an operating parameter of the bicycle suspension element in response to an electrical bicycle seat position signal that corresponds to a position of the bicycle seat relative to a support member by which the bicycle seat is mounted.

2. The apparatus according to claim 1 further comprising a bicycle seat position signal receiver that receives a bicycle seat position signal corresponding to a bicycle seat position, wherein the suspension parameter controller provides the suspension parameter controlling signal to control an operating parameter of the bicycle suspension element in response to the bicycle seat position signal.

3. The apparatus according to claim 2 further comprising a bicycle seat position sensor for sensing the bicycle seat position, wherein the bicycle seat position sensor provides the bicycle seat position signal to the bicycle seat position signal receiver.

4. The apparatus according to claim 2 wherein the suspension parameter controller provides the suspension parameter controlling signal when the bicycle seat position signal corresponds to a bicycle seat position that is past a predetermined value.

5. The apparatus according to claim 4 wherein the suspension parameter controlling signal is adapted to set the operating parameter of the bicycle suspension element to a first setting when the bicycle seat position signal corresponds to a bicycle seat position that is below a predetermined value, and wherein the suspension parameter controlling signal is adapted to set the operating parameter of the bicycle suspension element to a second setting when the bicycle seat position signal corresponds to a bicycle seat position that is above the predetermined value.

6. The apparatus according to claim 2 wherein the bicycle seat position signal varies according to variation of the bicycle seat position, and wherein the suspension parameter controlling signal is adapted to vary the operating parameter of the bicycle suspension element by an amount corresponding to the amount of variation of the bicycle seat position.

7. The apparatus according to claim 2 wherein the operating parameter of the bicycle suspension element is at least one of a stroke value, a spring preload value, a chamber pressure value, a chamber volume value, a damping value, or a lockout value of the bicycle suspension element.

8. The apparatus according to claim 2 wherein, when the bicycle seat position signal corresponds to a bicycle seat position that is below a predetermined value, the suspension parameter controlling signal is adapted to perform at least one of decreasing a damping value of the bicycle suspension element, increasing a stroke value of the bicycle suspension element, or setting a lockout value of the bicycle suspension element so that the bicycle suspension element is not in a lockout state.

9. The apparatus according to claim 8 further comprising a bicycle gear position signal receiver that receives a bicycle gear position signal corresponding to a gear position of a bicycle transmission, wherein the suspension parameter controller provides the suspension parameter controlling signal to decrease the damping value of the bicycle suspension element, to increase the stroke value of the bicycle suspension element, or to set the lockout value of the bicycle suspension element when the gear position signal corresponds to the bicycle transmission being in a predetermined gear.

10. The apparatus according to claim 8 wherein the suspension parameter controlling signal is adapted to decrease the damping value of the bicycle suspension element by an amount corresponding to an amount of variation of seat position or to increase the stroke value of the bicycle suspension element by an amount corresponding to an amount of variation of seat position.

11. The apparatus according to claim 2 wherein, when the bicycle seat position signal corresponds to a bicycle seat position that is above a predetermined value, the suspension parameter controlling signal is adapted to perform at least one of increasing a damping value of the bicycle suspension element, decreasing a stroke value of the bicycle suspension element, or setting a lockout value of the bicycle suspension element so that the bicycle suspension element is in a lockout state.

12. The apparatus according to claim 11 further comprising a bicycle gear position signal receiver that receives a bicycle gear position signal corresponding to a gear position of a bicycle transmission, wherein the suspension parameter controller provides the suspension parameter controlling signal to increase the damping value of the bicycle suspension element, to decrease the stroke value of the bicycle suspension element, or to set the lockout value of the bicycle suspension element when the gear position signal corresponds to the bicycle transmission being in a predetermined gear.

13. The apparatus according to claim 11 wherein the suspension parameter controlling signal is adapted to increase the damping value of the suspension element by an amount corresponding to an amount of variation of seat position or to decrease the stroke value of the suspension element by an amount corresponding to an amount of variation of seat position.

14. The apparatus according to claim 2 wherein the suspension parameter controller provides a first suspension parameter controlling signal to control an operating parameter of a front bicycle suspension element, and wherein the suspension parameter controller provides a second suspension parameter controlling signal to control an operating parameter of a rear bicycle suspension element.

15. The apparatus according to claim 14 wherein, when the bicycle seat position signal corresponds to a bicycle seat position that is below a predetermined value, the suspension parameter controller provides the first suspension parameter controlling signal and the second suspension parameter controlling signal to perform at least one of the following:
  (a) decreasing a damping value of the front bicycle suspension element and increasing a stroke value of the rear bicycle suspension element;
  (b) decreasing the damping value of the front bicycle suspension element and setting a lockout value of the rear bicycle suspension element so that the rear bicycle suspension element is not in a lockout state;
  (c) increasing a stroke value of the front bicycle suspension element and decreasing a damping value of the rear bicycle suspension element;
  (d) increasing the stroke value of the front bicycle suspension element and setting the lockout value of the rear bicycle suspension element so that the rear bicycle suspension element is not in a lockout state;
  (e) increasing the stroke value of the rear bicycle suspension element and setting a lockout value of the front bicycle suspension element so that the front bicycle suspension element is not in a lockout state; or
  (f) decreasing the damping value of the rear bicycle suspension element and setting the lockout value of the front bicycle suspension element so that front bicycle suspension element is not in a lockout state.

16. The apparatus according to claim 15 further comprising a bicycle gear position signal receiver that receives a bicycle gear position signal corresponding to a gear position of a bicycle transmission, wherein the suspension parameter controller provides the first suspension parameter controlling signal and the second suspension parameter controlling signal to change the operating parameters of the front bicycle suspension element and the rear bicycle suspension element when the gear position signal corresponds to the bicycle transmission being in a predetermined gear.

17. The apparatus according to claim 15 wherein the first suspension parameter controlling signal and the second parameter controlling signal are adapted to change the operating parameter of at least one of the front bicycle suspension element or the rear bicycle suspension element by an amount corresponding to an amount of variation of seat position.

18. The apparatus according to claim 17 wherein the first suspension parameter controlling signal and the second parameter controlling signal are adapted to change the operating parameters of the front suspension element and the rear suspension element by amounts corresponding to an amount of variation of seat position.

19. The apparatus according to claim 14 wherein, when the bicycle seat position signal corresponds to a bicycle seat position that is above a predetermined value, the suspension parameter controller provides the first suspension parameter controlling signal and the second suspension parameter controlling signal to perform at least one of the following:
  (a) increasing a damping value of the front bicycle suspension element and decreasing a stroke value of the rear bicycle suspension element;
  (b) increasing the damping value of the front bicycle suspension element and setting a lockout value of the rear bicycle suspension element so that the rear bicycle suspension element is in a lockout state;
  (c) decreasing a stroke value of the front bicycle suspension element and increasing a damping value of the rear bicycle suspension element;
  (d) decreasing the stroke value of the front bicycle suspension element and setting the lockout value of the rear bicycle suspension element so that the rear bicycle suspension element is in a lockout state;
  (e) decreasing the stroke value of the rear bicycle suspension element and setting a lockout value of the front bicycle suspension element so that the front bicycle suspension element is in a lockout state; or
  (f) increasing the damping value of the rear bicycle suspension element and setting the lockout value of the front bicycle suspension element so that the front bicycle suspension element is in a lockout state.

20. The apparatus according to claim 19 further comprising a bicycle gear position signal receiver that receives a bicycle gear position signal corresponding to a gear position of a bicycle transmission, wherein the suspension parameter controller provides the first suspension parameter controlling signal and the second suspension parameter controlling signal to change the operating parameters of the front bicycle suspension element and the rear bicycle suspension element when the gear position signal corresponds to the bicycle transmission being in a predetermined gear.

21. The apparatus according to claim 19 wherein the first suspension parameter controlling signal and the second parameter controlling signal are adapted to change the operating parameter of at least one of the front bicycle suspension element or the rear bicycle suspension element by an amount corresponding to an amount of variation of seat position.

22. The apparatus according to claim 21 wherein the first suspension parameter controlling signal and the second parameter controlling signal are adapted to change the operating parameters of the front bicycle suspension element and the rear bicycle suspension element by amounts corresponding to an amount of variation of seat position.

23. The apparatus according to claim 1 wherein the seat is movably mounted relative to a seat mounting member.

24. The apparatus according to claim 23 wherein the bicycle seat position signal corresponds to the position of the bicycle seat relative to the seat mounting member.

25. The apparatus according to claim 24 wherein the seat mounting member comprises a seat tube.

26. The apparatus according to claim 25 wherein the bicycle seat is mounted to a seat post that is telescopingly mounted to the seat tube.

* * * * *